United States Patent

[11] 3,605,027

[72] Inventors Daniel R. Nichols
Linthicum Heights;
John O. Wedel, Baltimore, both of, Md.
[21] Appl. No. 800,918
[22] Filed Feb. 19, 1969
[45] Patented Sept. 14, 1971
[73] Assignee The United States of America as represented by the Secretary of the Navy

[54] LOG AMPLIFIER
2 Claims, 2 Drawing Figs.

[52] U.S. Cl. .......... 328/145, 307/229, 307/237
[51] Int. Cl. .......... G06g 7/24
[50] Field of Search .......... 307/229, 237; 328/145, 143

[56] References Cited
UNITED STATES PATENTS 2,577,506 12/1951 Belleville .......... 328/145
2,729,743 1/1956 Le Grand .......... 328/145
3,371,224 2/1968 Polo .......... 328/143
3,403,347 9/1968 Stull .......... 328/145
3,435,353 3/1969 Sauber .......... 328/145
3,480,793 11/1969 Strauss .......... 328/143

OTHER REFERENCES

" Operational Amplifier Basics" by Lynch Radio-Electronics, May 1968 pages 54- 57

*Primary Examiner*—Donald D. Forrer
*Assistant Examiner*—Harold A. Dixon
*Attorneys*—E. J. Brower, A. W. Collins and S. J. Bor

ABSTRACT: A log intermediate-frequency amplifier in which a voltage feedback circuit is used between the output and the input of a summing DC amplifier to provide a substantially low effective input impedance for the DC amplifier to eliminate the error caused by the possibility of back biasing of detector stages comprising part of the composite log amplifier.

INVENTORS
DANIEL R. NICHOLS
JOHN O. WEDEL

BY

Arthur L. Collins

ATTORNEY

LOG AMPLIFIER

The present invention relates generally to log amplifiers, and more particularly to a successive limit and detection log intermediate-frequency amplifier incorporating an operational amplifier to provide marked improvement in the summing of detected signals on a summing line provided therefore.

Presently, one of the many methods of obtaining the log of an AM modulation on an intermediate-frequency (IF) signal is by using a network of cascaded IF amplifier, limit and detection stages. A frequent problem encountered in this type of log amplifier is that a low value of input resistance is needed for the output connecting or summing amplifier stage to keep the large detected signal from the final cascaded amplifier from feeding back along the summing line to back bias the preceding detector stages. This back biasing introduces unwanted error in the log characteristics of the composite amplifier. In addition, when the modulation bandwidth is sufficiently narrow and the signal developed across the input resistance is amplified by a stable DC amplifier to get the signal to the required level, the value of the input resistance is selected solely on the basis of the linearity requirement of the system. Since the typical impedance ratio of the impedance of the individual detector stages and the input impedance is on the order of $10^2$ to $10^3$, and since gains of the same order are typically required, this places an excessive requirement on the stability of the DC amplifier used to sum the separate rectified signals.

It is therefore a principal object of the present invention to provide a novel and improved log IF amplifier.

It is a more specific object of the present invention to provide a log IF amplifier circuit having improved linearity and stability of the output log characteristics not possible in prior art log amplifiers.

A further object of the present invention is to provide a simple and efficient feedback network for a DC summing amplifier of a successive limit and detection log IF amplifier to eliminate error caused by the back biasing of any detector stages.

The above and still further objects, features and attendant advantages of the present invention will become apparent from a consideration of the following detailed description of a preferred embodiment thereof, especially when taken in conjunction with the accompanying drawing, in which.

Figures 1, 2:
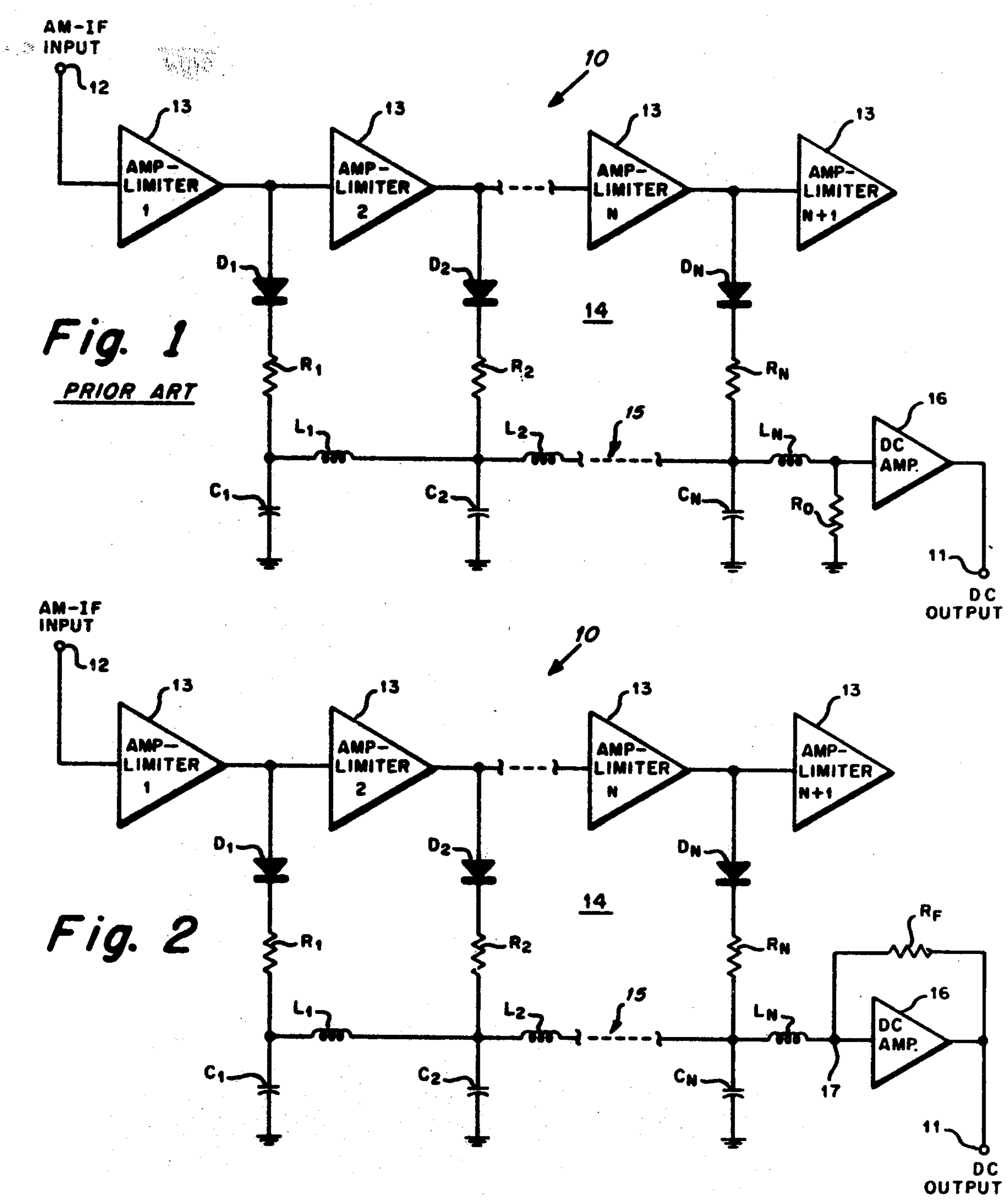
Fig. 1 PRIOR ART, Fig. 2
FIG. 1 is a circuit diagram of a typical prior art log IF amplifier.
FIG. 2 is a circuit diagram of a preferred embodiment of the log IF amplifier according to the present invention.

Referring now to the drawing, wherein like reference numerals and letters are used to designate like components in the circuits shown by the two figures, the AC circuit diagram of FIG. 1 represents a conventional log IF amplifier 10 capable of producing an output signal at terminal 11 which is proportional to the logarithm of the AM-IF input signal applied at terminal 12. In a typical application, log amplifier 10 might be used in a radar angle track assembly, and in such case it is essential that the summing amplifier be extremely stable and have uniform amplification so that there will be an accurate linear output.

Log amplifier 10 typically comprises a plurality of cascaded amplifier-limiter stages 13, no. 1 to no. N+1, having a preselected gain, bandwidth and limit value depending on the AM-IF input signal applied at the terminal 12 and the log output signal to be taken from the terminal 11. A detector network 14 is provided including a plurality of forward biased semiconductor diodes $D_1$ to $D_N$ connected from the output of each of the amplifier-limiter stages 13, 1 to N, in series with a resistor R and a capacitor C connected to ground. A summing line 15 is provided comprising inductors $L_1$ to $L_N$, the individual inductors connecting the junction points of the RC combinations to each other with the last inductor $L_N$ being connected between the junction of the resistors $R_N$ and $C_N$ and a DC amplifier 16, which amplifies the sum of the detected signals from the first N amplifier-limiters 13 to produce a log output at the terminal 11. An input resistor $R_O$ is connected between the junction of the inductor $L_N$ and the DC amplifier 16 and ground to prevent the large detected signal from the $N^{th}$ amplifier-limiter 13 from feeding back along the summing line 15 and thereby back biasing the diodes D of the other N–1 detector stages, that is, so that the entire signal developed across the resistor $R_O$ may be amplified by the DC amplifier 16. To prevent this back biasing from occurring, it is necessary, but sometimes very difficult, to select a very low value of resistance for the resistor $R_O$.

In certain circuit applications, in particular when the bandwidth of the AM-IF input signal is substantially wide, the value of the input resistor $R_O$ cannot be as small a resistance as is necessary to prevent back biasing since it is the effective termination for the LC network which operates as a lump constant delay line. This delay line is necessary since the delays introduced by the amplifier-limiter stages 13 must be compensated for by the summing line 15, to insure that the AM-IF input signal will be time coincident at the individual detector stage outputs ($R_1$ to $R_N$).

In still other applications of the log amplifier 10 the bandwidth of AM-IF input signal will be sufficiently narrow so that a delay line, per se, will not be required. Instead, the inductors L of the summing line 15 will primarily provide IF decoupling between the successive detector stages. This means that the value of the resistor $R_O$ may be selected primarily on the basis of the linearity requirements of the log amplifier 10. The ratio of the value of the resistor $R_N$, or any of the other diode resistors R which are selected to be of equal value, to that of $R_O$ is typically in the range between $10^2$ to $10^3$, with $R_N$ chosen to be equal to 1 kilohm. Since the signal levels developed across the resistor $R_O$ are typically in the millivolt range and the output from the DC amplifier 16 is required to be in the volt range, gains of between $10^2$ and $10^3$ are required, which, as previously stated, place stringent requirements on the DC stability of the amplifier 16.

In order to improve this condition, a feedback network is provided for the DC amplifier 16 to replace the input resistor $R_O$, which operates to provide a low effective input resistance for the summing amplifier 16. The AC circuit for the log amplifier 10 according to the invention is shown in FIG. 2, to which reference is now made. It will be observed that the log amplifier corresponds to that illustrated in FIG. 1, the novelty residing in the manner in which the circuit provides a low effective input resistance to the DC amplifier 16 to prevent back biasing from occurring, thereby obtaining improved linearity and stability of the log output characteristic.

The feedback network comprises a resistor $R_F$ connected between the input and output of the DC amplifier 16. In operation, if the forward gain G of the amplifier 16 is large compared to the ratio of $R_F/R_N$, then the gain from each detected output can be approximately by that ratio of resistance. Typically, the closed-loop gain of the amplifier 16 is unity so that volt level signals may be obtained from the output. The input impedance the, at the summing point on the summing line 15, that is, the junction point 17 between the inductor $L_N$ and the amplifier 16, is approximately $R_F/G$. Accordingly, if $R_F$ is chosen to be 10 kilohms and G is equal to $10^6$ the effective input impedance to the amplifier 16 is equal to $10^1$ohms. Therefore, the ratio of any of the diode resistors, $R_1$ to $R_N$, to the input impedance is equal to $10^5$, making the error due to any possible back biasing of the diodes $D_1$ to $D_N$ insignificant for most applications. To this extent, the feedback network operates identically to the fixed input resistor $R_O$ of FIG. 1, in conjunction with the log amplifier 10, without any of the inherent disadvantages thereof. Accordingly, an extremely low effective input impedance is presented with a stable DC gain resulting in a substantial improvement in output linearity over that provided by related prior art circuits.

While a preferred embodiment of the invention has been disclosed, it will be apparent that variations in the specific details of construction which have been illustrated and described may be resorted to without departing from the spirit and scope of the invention, as defined in the appended claims.

What is claimed is:

1. A log IF amplifier comprising:

a. a plurality of cascaded AM–IF amplifier-limiter stages;

b. a detector stage for each amplifier-limiter stage, each said detector stage including a forward biased semiconductor diode, a resistor and a capacitor series connected between the output circuit of its associated amplifier-limiter stage and ground;

c. a DC amplifier;

d. a summing line including a plurality of inductors, individual inductors of the summing line interconnecting resistor-capacitor junctions of adjacent detector stages to one another and to the DC amplifier;

e. and a feedback network comprising a resistor connected between the input and output of the DC amplifier whereby the effective input resistance to said DC amplifier is of a substantially low value to prevent the large detected signal from the last amplifier stage from feeding back along the summing line to back bias the diodes of the remaining detector stages.

2. A log IF amplifier substantially as described in claim 5 wherein:

a. the resistance value of the resistors of the detector stages are equal;

b. and wherein the forward gain of the DC amplifier is substantially larger than the ratio of the resistance of the feedback resistor and a detector stage resistor, and the closed-loop gain of said DC amplifier is unity, whereby the effective input impedance to said DC amplifier is approximately equal to the ratio of the resistance of the feedback resistor and the forward gain of said DC amplifier.